United States Patent [19]

Frank, deceased et al.

[11] Patent Number: 5,052,440

[45] Date of Patent: Oct. 1, 1991

[54] LIQUID DROPLET GENERATOR VALVE

[75] Inventors: Arthur M. Frank, deceased, late of Plainview; Jill F. Willman, executrix, Port Washington, both of N.Y.

[73] Assignee: Grumman Aerospace Corporation, Bethpage, N.Y.

[21] Appl. No.: 343,647

[22] Filed: Apr. 27, 1989

[51] Int. Cl.$^5$ ............................ F16K 3/02; F16K 3/16
[52] U.S. Cl. ............................... 137/625.33; 251/176; 251/326; 251/328
[58] Field of Search .................. 251/326, 328, 176; 137/625.33

[56] References Cited

U.S. PATENT DOCUMENTS

| 3,312,238 | 4/1967 | Voit, Jr. |
| 3,323,774 | 6/1967 | Wilson |
| 3,506,168 | 4/1970 | Dowdy et al. |
| 3,990,476 | 11/1976 | Young et al. ............... 137/625.46 |
| 4,064,900 | 12/1977 | Neward |
| 4,154,379 | 5/1979 | Schermutzki |
| 4,257,543 | 3/1981 | Muschner et al. |
| 4,294,406 | 10/1981 | Pevnick |
| 4,493,476 | 1/1985 | Strickland et al. |
| 4,546,821 | 10/1985 | Kummel |
| 4,702,309 | 10/1987 | Frank |
| 4,738,665 | 4/1988 | Shepard .......................... 138/43 X |

Primary Examiner—Arnold Rosenthal
Attorney, Agent, or Firm—Pollock, VandeSande & Priddy

[57] ABSTRACT

An in-line valve is employed in a droplet generator for sharply cutting off the flow of liquid and preventing drips from forming at the outlet of the generator. In order to effect valve action, the interior surface of a droplet-forming orifice plate is machined optically flat. A movable valve plate having openings therein, corresponding to the pattern of orifices in the orifice plate, is positioned in abutting relationship to the interior surface of the orifice plate; and its interface surface is likewise machined optically flat so that the interface forms a liquid seal. When the valve plate is moved to a position where openings therein are in registry with the orifices, a droplet stream is generated. However, when the valve plate is moved in shear translation, registration between the openings therein and the orifices no longer exists and the flow of fluid therebetween is quickly stopped.

7 Claims, 1 Drawing Sheet

VALVE OPEN

VALVE CLOSED

LIQUID DROPLET GENERATOR VALVE

FIELD OF THE INVENTION

The present invention relates to liquid droplet radiators, and more particularly to a valve utilized in a droplet generator portion of such a radiator.

BACKGROUND OF THE INVENTION

The rejection of heat in space is a critical aspect of virtually all proposed space-borne installations, from solar power satellites to low temperature materials processing laboratories. On purely thermodynamic grounds it is desirable to reject heat at as low a temperature as possible, for instance, to maximize efficiency in a power cycle or to minimize the work required to drive a heat pump, and this implies a large radiator area and mass. This obviously conflicts with the basic requirement that any space-based installation has minimal mass. The balance between device performance and radiator mass thus forms a central design problem for many space systems.

In most designs the radiator is composed of an array of tubes or tube-fin structures through which flows a coolant. The tubes must be sufficiently massive to minimize micrometeorical penetration; in addition, transport of the coolant over large distances is often required. Radiator mass in such designs often comprises a large fraction of the total system mass.

J. M. Hedgepeth proposed, in "Ultralightweight Structures for Space Power," in Radiation Energy Conversion in Space, Vol. 61 of Progress in Astronautics and Aeronautics, K. W. Billman, ed. (AIAA, New York, 1978), p. 126, the use of a dust radiator to reduce the radiator weight of solar power satellites. A cylindrical column of dust particles is heated radiatively by the working fluid of a thermal engine and is then sent on a 100 m to 10,000 m trajectory to radiate energy into space and finally is collected, reheated, and redirected. While this idea holds promise for sizeable weight reduction, it has significant practical problems, such as the inefficiency of heating the dust by radiation, the difficulty of manipulating a stream of dust, and degradation of the dust itself over time.

The concept of using a stream of liquid droplets as a lightweight radiator for space retains the low-mass advantages of a dust radiator and has the additional advantages of allowing heat transfer by conductor (heat exchanger) and ease of manipulation. To indicate the degree of improvement possible using droplets instead of tube and fin structures to radiate heat, it is noted that radiator performance is characterized primarily by the specific mass, i.e., mass per radiator area. The best tube and fin designs incorporating heat pipes have specific masses of 5–10 kg/m$^2$. The specific mass of a droplet is simply $\frac{4}{3}$ pa, where a is the droplet radius. Even with a medium as heavy as liquid tin (p=6.8 g/cm$^3$), which turns out to be an excellent medium for rejection in space thermal engines, the specific mass is 0.1 kg/m$^2$ for 0.1 mm diameter droplets, a 50-fold improvement over tubefin radiators.

A recent advance in the construction of liquid droplet radiators is directed to the collector portion disclosed in U.S. Pat. No. 4,702,309 in the name of the present inventor and assigned to the present assignee. Although that disclosed collector portion of the radiator may be considered to operate satisfactorily, problems have been discovered in connection with the droplet generator which limits the usefulness thereof. In particular, a liquid is forced through tiny orifices to generate droplets which are then directed to the radiator collector. During continued use of existing generators, it has been found that liquid drips from the outlet of the orifices each time the liquid flow is turned off and this creates a contaminating liquid source for surrounding structures.

Accordingly, there is a need to sharply shut off the liquid flow from the generator without creating contaminating liquid drips.

BRIEF DESCRIPTION OF THE INVENTION

The present invention achieves this end by inserting a valve in a position immediately preceding the orifices of the generator. The valve is specially constructed to sharply shut off the flow of liquid through the orifices when the radiator is in an inoperative condition. Structurally, the valve comprises a plate having openings therein which are aligned with the droplet generator orifices when a droplet stream is to be created. However, by forming an optically flat interface between the valve plate with the openings and the confronting surface of the orifice plate, an extremely effective seal is created when the valve plate is moved to a shut-off position wherein the openings therein are moved to a non-aligned relationship with corresponding orifices. A solenoid, cam, or other actuator may be employed to quickly shift the valve plate between on and off positions. As a result, when the valve is switched between on and off flow states, the droplet flow will begin and end with sharp leading and trailing stream edges that prevent the formation of unwanted drips at the orifice outlets.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
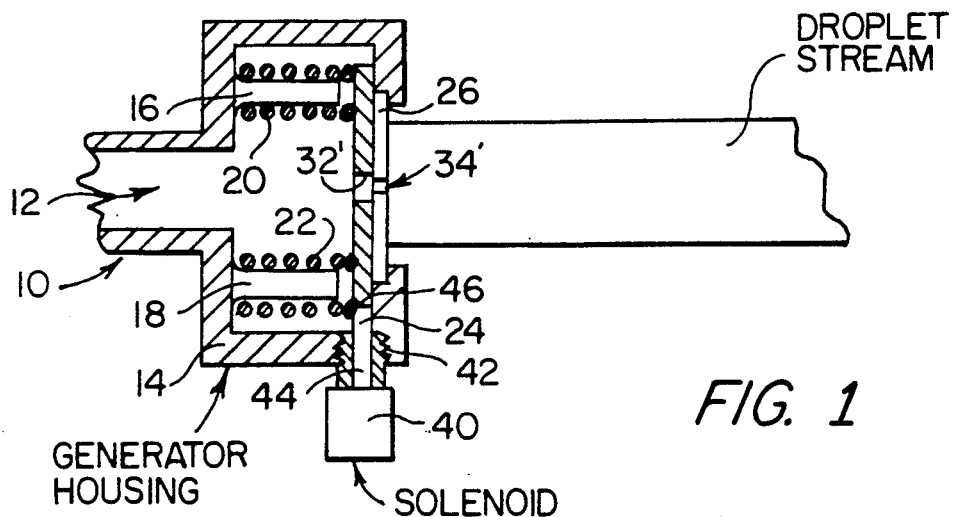
FIG. 1 is a sectional view of the present invention illustrating an elementary movable valve plate and orifice plate.

Referring to the figures, and more particularly FIG. 1, the generator of the present invention is generally illustrated by reference numeral 10. The purpose of this generator is to convert a stream 12 of inlet cooling fluid to a stream of droplets at the outlet of the generator, as indicated. The droplets are then propelled toward a collector, through space, where the heated droplets are cooled and collected as previously discussed in connection with the Background of the Invention. As will be seen from FIG. 1, in the interior of generator housing 14 are two stationary posts 16 and 18, which extend in parallel spaced relationship to the inlet 12. The shape of housing 14 may be transversely rectangular although other geometric shapes are quite possible.

The posts 16 and 18 each mount a compressed coil spring (20, 22) for biasing a valve plate 24 outwardly against an orifice plate 26. The purpose of the valve plate 24 is to serve as a shear seal for the orifices formed in plate 26. In the elementary configuration shown in FIG. 1, the flow at inlet 12 will be forced through opening 32' in valve plate 24; and with the valve in the open condition illustrated in FIG. 1, the flow will continue through an aligned orifice 34' formed in the orifice plate 26. When the valve plate 24 is moved so that alignment between opening 32' and orifice 34' no longer exists, the generation of a droplet stream is quickly stopped and the object of the invention is achieved, namely, no liquid will drip from the orifice plate to any surrounding structure.

In order to achieve shear motion of the valve plate 24, relative to the orifice plate 26, a solenoid 40 may be employed. The housing of the solenoid may be extended to a threaded member 42, which is threaded into the housing 14 of the generator 10. A solenoid actuator 44 may be appropriately attached, such as by means of welding to the bottom of the valve plate 24. The actuator 44 will position the valve plate 24 between open and closed positions as illustrated in FIGS. 2 and 3.

In order for the valve plate 24 to achieve a liquid seal with the orifice plate 26 when the openings 32' and orifices 34' are in a non-aligned condition, their interface 27 comprising surfaces 28 and 30 must be machined to be optically flat. This would mandate flat surfaces to a tolerance of ±0.0001 inch.

Figure 2:
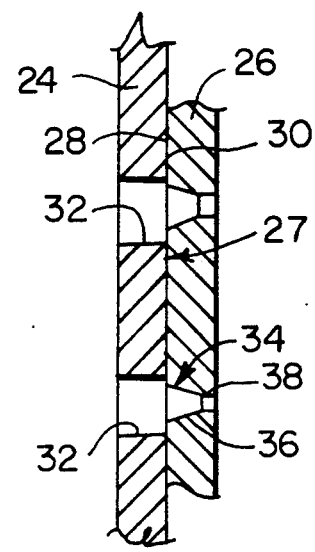
FIG. 2 is a partial sectional view of the interfacing valve plate and orifice plate when the valve is open.

FIG. 2 shows portions of the valve plate 24 and orifice plate 26 in greater detail while the valve is in an open condition. The optically flat surfaces of the valve and orifice plates are respectively indicated by reference numerals 28 and 30. In a preferred embodiment of the invention, the openings 32 in the valve plate 24 may be formed in a number of rows, each row having a plurality of openings. However, rather than the simple cylindrical orifice, such as shown by reference numeral 34' in FIG. 1, a preferred embodiment of the invention includes a step-down orifice generally indicated by reference numeral 34 in FIG. 2. The orifice includes an inward frusto-conical section 36 articulating to an outwardly directed cylindrical section 38. This two-part step-down orifice has been found to create more perfectly formed droplets. The number of orifices is designed to correspond with the openings in the valve plate 24 and is intended to have the same geometric relationship as the openings so that the openings 32 and orifices 34 become respectively aligned when the valve is in an open condition as shown in FIG. 2.

Figure 3:
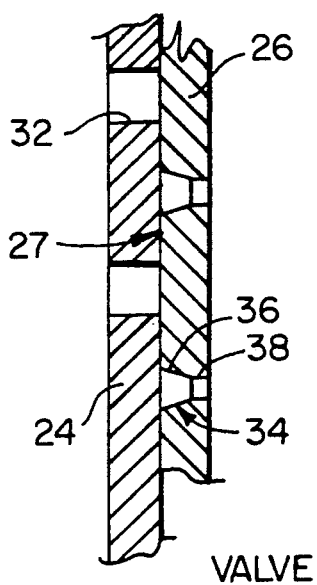
FIG. 3 is a partial sectional view of the interfacing valve plate and orifice plate when the valve is closed.

In FIG. 3 the valve plate 24 is shown to be displaced to a closed condition wherein the openings 32 and corresponding orifices 34 are no longer in alignment so that liquid cannot flow therethrough. In addition, as previously explained, the optically flat interface between the plates creates a liquid seal to complete proper valve action.

In accordance with the previous description, it will be appreciated that the present invention provides an inline valve for sharply cutting off liquid flow therethrough. The end result is particularly advantageous for a droplet generator wherein dripping cooling liquid is prevented from forming thereby avoiding the contamination of surrounding structure.

It should be understood that the invention is not limited to the exact details of construction shown and described herein for obvious modifications will occur to persons skilled in the art.

I claim:

1. A valve for sharply cutting off the flow of fluid comprising:
    a first plate characterized by interior and exterior surfaces and having at least one outlet orifice formed therein;
    a second plate having at least one opening therein, the second plate abutting the interior of the first plate;
    the abutting surfaces being optically flat to create a seal therebetween; and
    means for moving the plates relative to one another between positions
    (a) wherein the opening and orifice are aligned for an open valve; and
    (b) wherein the opening and orifice are not aligned thereby closing the valve.

2. The structure set forth in claim 1 wherein the moving means has actuator means connected to the second plate for moving it between open and closed valve positions.

3. A droplet generator comprising:
    a housing;
    a stationary plate attached to an outlet of the housing and having orifices formed therein;
    a movable valve plate located within the housing and abutting an internal surface of the stationary plate, the abutting plate surfaces being optically flat to form a fluid seal therebetween;
    openings formed in the movable plate, in locations corresponding to those of the orifices; and
    means for moving the plates relative to one another between positions
    (a) wherein the openings and corresponding orifices are aligned for an open valve; and
    (b) wherein the openings and corresponding orifices are not aligned thereby closing the valve.

4. The structure set forth in claim 3 wherein the moving means has an actuator means connected to the movable plate for moving it between open and closed valve positions.

5. The structure set forth in claim 4 wherein each orifice has a downstream step-down configuration comprising a frusto-conical section extending to a cylindrical section.

6. The structure set forth in claim 5 together with spring means located within the housing for biasing the movable plate, in abutting relation to the stationary plate.

7. A method for sharply shutting off the flow of fluid through a valve comprising the steps:
    creating an optically flat fluid sealing interface between a first plate having openings therein and a second plate having orifices therein, the latter correspondingly positioned relative to the openings;
    forcing fluid through the openings and orifices of the plates when they are maintained in a first position wherein the openings and orifices are respectively aligned; and
    moving the plates relative to one another so that the openings and orifices are not aligned thereby sharply cutting off fluid flow through the plates.

* * * * *